United States Patent
Sugimoto

(10) Patent No.: US 9,238,387 B2
(45) Date of Patent: Jan. 19, 2016

(54) PNEUMATIC TIRE

(75) Inventor: Mutsuki Sugimoto, Kobe (JP)

(73) Assignee: SUMITOMO RUBBER INDUSTRIES, LTD., Kobe-shi (JP)

(*) Notice: Subject to any disclaimer, the term of this patent is extended or adjusted under 35 U.S.C. 154(b) by 33 days.

(21) Appl. No.: 13/878,499

(22) PCT Filed: May 31, 2011

(86) PCT No.: PCT/JP2011/062491
§ 371 (c)(1),
(2), (4) Date: Apr. 9, 2013

(87) PCT Pub. No.: WO2012/060126
PCT Pub. Date: May 10, 2012

(65) Prior Publication Data
US 2013/0199687 A1    Aug. 8, 2013

(51) Int. Cl.
*B60C 1/00* (2006.01)
*B60C 5/14* (2006.01)
*C08L 53/00* (2006.01)

(52) U.S. Cl.
CPC .............. *B60C 1/0008* (2013.04); *B60C 5/14* (2013.01); *C08L 53/00* (2013.01); *B60C 2005/145* (2013.04)

(58) Field of Classification Search
CPC .............. B60C 5/00; B60C 5/12; B60C 5/14; B60C 5/142; B60C 1/0008
See application file for complete search history.

(56) References Cited

U.S. PATENT DOCUMENTS

| | | | |
|---|---|---|---|
| 6,028,147 A * | 2/2000 | Ogawa et al. ................. 525/292 |
| 2008/0314492 A1 | 12/2008 | Tsou et al. |
| 2010/0126647 A1 | 5/2010 | Hashimura et al. |
| 2010/0181003 A1 | 7/2010 | Inoue |
| 2010/0263778 A1 | 10/2010 | Lesage et al. |
| 2010/0294411 A1 | 11/2010 | Custodero et al. |

(Continued)

FOREIGN PATENT DOCUMENTS

| | | |
|---|---|---|
| CN | 101754866 A | 6/2010 |
| EP | 0 206 756 A2 | 12/1986 |

(Continued)

OTHER PUBLICATIONS

Machine translation of JP 2010-100082, 2010.*

(Continued)

*Primary Examiner* — Justin Fischer
(74) *Attorney, Agent, or Firm* — Birch, Stewart, Kolasch & Birch, LLP

(57) ABSTRACT

A pneumatic tire includes an inner liner disposed inwardly in the tire relative to a carcass ply bridged between a pair of bead portions, the inner liner being formed of a first layer disposed inwardly in the tire, and a second layer disposed in contact with a rubber layer of the carcass ply, the first layer being a thermoplastic elastomer composition mainly containing a styrene-isobutylene-styrene block copolymer, the second layer being a styrene-based thermoplastic elastomer composition, (a) at least one of the thermoplastic elastomer compositions of the first and second layers containing a tackifier by 0.1 part by mass to 100 parts by mass relative to 100 parts by mass of a thermoplastic elastomer component, or (b) the second layer containing the styrene-isobutylene-styrene block copolymer by 10 mass % to 80 mass % relative to a thermoplastic elastomer component thereof.

3 Claims, 2 Drawing Sheets

(56) References Cited

U.S. PATENT DOCUMENTS

2011/0011511 A1   1/2011   Miyazaki et al.
2012/0003413 A1   1/2012   Lesage et al.

FOREIGN PATENT DOCUMENTS

| | | |
|---|---|---|
| EP | 2 404 766 A1 | 1/2012 |
| JP | 62-48704 A | 3/1987 |
| JP | 64-62308 A | 3/1989 |
| JP | 2010-13646 A | 1/2010 |
| JP | 2010-100082 A | 5/2010 |
| JP | 2010-100675 A | 5/2010 |
| JP | 2010-162825 A | 7/2010 |
| JP | 2010-528919 A | 8/2010 |
| JP | 2010-532801 A | 10/2010 |
| WO | WO 02/100153 A2 | 12/2002 |
| WO | WO 2008/029781 A1 | 3/2008 |
| WO | WO 2010/063427 A1 | 6/2010 |

OTHER PUBLICATIONS

Japanese Office Action for Japanese Application No. 2012-095514 dated Jul. 2, 2013.

Notice of Allowance dated Feb. 18, 2014 for Japanese Application No. 2012-095514.

International Search Report, mailed Aug. 16, 2011, issued in PCT/JP2011/062491.

Ineos Oligomers, Indopol Polybutene, "Delivering Value Through Versatility", Nov. 30, 2009.

Chinese Office Action and Search Report, dated Mar. 23, 2015, for Chinese Application No. 201180052344.1, along with English translation.

* cited by examiner (a)

(b)

(c)

(d)

PNEUMATIC TIRE

TECHNICAL FIELD

The present invention relates to a pneumatic tire including an inner liner, in particular, a pneumatic tire in which crack growth resulting from repeated flection deformation during traveling with the tire is reduced in the inner liner, in which decrease of tire internal pressure is reduced, and in which rolling resistance is reduced.

BACKGROUND ART

In recent years, in response to strong social demands for low fuel consumption of vehicles, weight reduction of tires has been sought. Among tire members, weight reduction and the like of an inner liner also have begun. The inner liner is disposed inwardly in a tire, and has a function of reducing an amount of leakage of air from inside to outside of the pneumatic tire.

Currently, a rubber composition for such an inner liner employs, for example, a rubber blend mainly containing a butyl rubber. The rubber blend contains the butyl rubber by 70 mass % to 100 mass %, and a natural rubber by 30 mass % to 0 mass %. In this way, the tire is provided with improved air permeability resistance. In addition to butylene, the rubber blend mainly containing the butyl rubber contains isoprene by approximately 1 mass %, which acts with sulfur, vulcanization accelerator, and zinc white to achieve cross-linking between rubber molecules. In the case of normal blend, the above-described butyl-based rubber needs to have a thickness of 0.6 mm to 1.0 mm for a tire of a passenger car, and needs to have a thickness of approximately 1.0 mm to 2.0 mm for a tire of a truck/bus. In order to achieve weight reduction of such tires, use of polymer, which is more excellent in air permeability resistance than the butyl-based rubber and can provide an inner liner layer with a thinner thickness, has been requested.

Conventionally, in order to achieve weight reduction of a tire, it has been proposed to use a film made of a material including a thermoplastic resin, instead of the above-described rubber composition. However, when a tire is manufactured using an inner liner of thin thermoplastic resin, the inner liner partially becomes too thin due to pressure in a vulcanization step, with the result that the finishing gauge of the inner liner in the resulting tire product becomes thinner than the designed gauge. In the thin portion of the inner liner thus finished, a phenomenon (open thread) in which a carcass cord looks to stand out takes place, thus giving a user an impression of bad appearance. In addition, when the inner liner is thin, gas barrier property becomes partially bad to decrease tire internal pressure, with the result that the tire may burst in the worst case.

Meanwhile, during traveling with the tire, large shear strain acts on a vicinity of a shoulder portion in the inner liner. When the material including the thermoplastic resin is used as the inner liner, this shear strain is likely to cause detachment at an adhesion interface between the inner liner and the carcass ply, with the result that air leakage takes place from the tire, disadvantageously.

Meanwhile, in order to achieve weight reduction of the inner liner, a technique also has been proposed to employ a thermoplastic elastomer material. However, it is known that a material, which is made thinner in thickness than the inner liner of butyl rubber and exhibits high air permeability resistance, is inferior to the inner liner of butyl rubber in terms of vulcanization adhesion strength with an insulation rubber or a carcass ply rubber adjacent to the inner liner.

When the inner liner has low vulcanization adhesion strength, air enters between the inner liner and the insulation rubber or the carcass rubber, thus resulting in a so-called "air-in phenomenon", in which small balloon-like objects appear. The multiplicity of such small spots in the tire give a user an impression of bad appearance. In addition, during traveling, the air causes detachment to result in cracks in the inner liner. Accordingly, the tire internal pressure is decreased, with the result that the tire may burst in the worst case.

Patent Literature 1 (Japanese Patent Laying-Open No. 2010-13646) proposes to improve strength in adhesion using a petroleum resin or a terpene resin in SIBS, which is a thermoplastic elastomer, as a tackifier. However, a polyamide-based polymer is blended in addition to the SIBS, so that flection cracking resistance is decreased, disadvantageously.

Meanwhile, Patent Literature 2 (Japanese Patent Laying-Open No. 2010-100675) proposes to improve adhesive property of a carcass ply rubber using, as a tackifier, a natural rosin, terpene, a chroman indene resin, a petroleum resin, an alkylphenol resin, or the like in a blended material having a polymer capable of cross-linking with SIBS by sulfur.

However, when the polymer capable of cross-linking by sulfur is contained by not more than 100 part by weight in a technique in which the polymer capable of vulcanization by sulfur is blended by 10 part by weight to 300 part by weight relative to 100 part by weight of the SIBS, the SIBS becomes a matrix (sea portion) and the polymer capable of cross-linking by sulfur becomes a domain structure (island portion). Accordingly, adhesion strength is not improved in a contact interface with the carcass rubber. Further, when the polymer capable of cross-linking by sulfur is not less than 100 part by weight, gas barrier property is decreased in rubbers other than the butyl rubber and adhesion strength is decreased in the butyl rubber. Moreover, depending on a polymer to be blended, viscosity becomes high, with the result that a film having a thickness of 600 μm or less cannot be fabricated, disadvantageously.

In Patent Literature 3 (WO2008-029781), a tire is manufactured using strips of film layer stack in which a thermoplastic resin and a thermoplastic elastomer are blended. With the film layer stack, gas barrier property and adhesive property can be improved, whereby bonding can be achieved between the ribbon-shaped strips. However, in this technique, gauge is constant in a non-vulcanized raw cover of film layer stack. Hence, when the gauge is thinned, a buttress portion or the like in the finished tire after vulcanization may become thin.

CITATION LIST

Patent Literature

PTL 1: Japanese Patent Laying-Open No. 2010-13646
PTL 2: Japanese Patent Laying-Open No. 2010-100675
PTL 3: WO2008/029781

SUMMARY OF INVENTION

Technical Problem

The present invention has its object to provide a pneumatic tire including an inner liner so as to reduce decrease of tire internal pressure, reduce crack growth in the inner liner which is caused by repeated flection deformation resulting from traveling with the tire, and reduce rolling resistance.

Solution to Problem

The present invention provides a pneumatic tire including an inner liner disposed inwardly in the tire relative to a carcass ply bridged between a pair of bead portions, the inner liner being formed of a first layer disposed inwardly in the tire, and a second layer disposed in contact with a rubber layer of the carcass ply, the first layer being a thermoplastic elastomer composition mainly containing a styrene-isobutylene-styrene block copolymer, the second layer being a styrene-based thermoplastic elastomer composition, (a) at least one of the thermoplastic elastomer compositions of the first and second layers containing a tackifier by 0.1 part by mass to 100 parts by mass relative to 100 parts by mass of the thermoplastic elastomer, or (b) the second layer containing the styrene-isobutylene-styrene block copolymer by 10 mass % to 80 mass % relative to a thermoplastic elastomer component thereof.

Desirably, the tackifier has a weight average molecular weight Mw of $1\times10^2$ to $1\times10^6$ and has a softening point falling within a range of 50° C. to 150° C. Preferably, the second layer is a thermoplastic elastomer composition containing at least one of a styrene-isoprene-styrene block copolymer and a styrene-isobutylene diblock copolymer, and the thermoplastic elastomer of the second layer contains the styrene-isobutylene-styrene block copolymer by 5 mass % to 90 mass %. Further, the present invention relates to the pneumatic tire in which the first layer has a thickness of 0.05 mm to 0.6 mm and the second layer has a thickness of 0.01 mm to 0.3 mm.

Desirably, the styrene-isobutylene-styrene block copolymer contains a styrene component at a content of 10 mass % to 30 mass %, and has a weight average molecular weight of 50,000 to 400,000, and the styrene-isoprene-styrene block copolymer contains a styrene component at a content of 10 mass % to 30 mass %, and has a weight average molecular weight of 100,000 to 290,000. Desirably, the styrene isobutylene block copolymer is linear, contains a styrene component at a content of 10 mass % to 35 mass %, and has a weight average molecular weight of 40,000 to 120,000.

Advantageous Effects of Invention

In the present invention, the inner liner is formed of the first layer mainly containing the SIBS and the second layer made of the styrene-based thermoplastic elastomer. The tackifier was mixed in one of the first layer and the second layer. Accordingly, vulcanization adhesion can be improved between the first layer and the second layer. As a result, adhesion between the first layer and the carcass ply is also enhanced. Thus, occurrence of the air-in phenomenon can be prevented between the first layer and the carcass ply, between the first layer and the second layer, and between the carcass ply and the second layer, thereby improving durability performance of the tire.

Further, the SIBS is blended in the second layer, so that adhesive property thereof with the first layer is improved, thereby further improving strength in adhesion between the first layer and the second layer and between the first layer and the carcass ply.

Each of FIG. 2(a) to FIG. 2(d) is a schematic cross sectional view showing an arrangement of an inner liner and a carcass.

DESCRIPTION OF EMBODIMENTS

<Structure of Tire>

Figure 1:
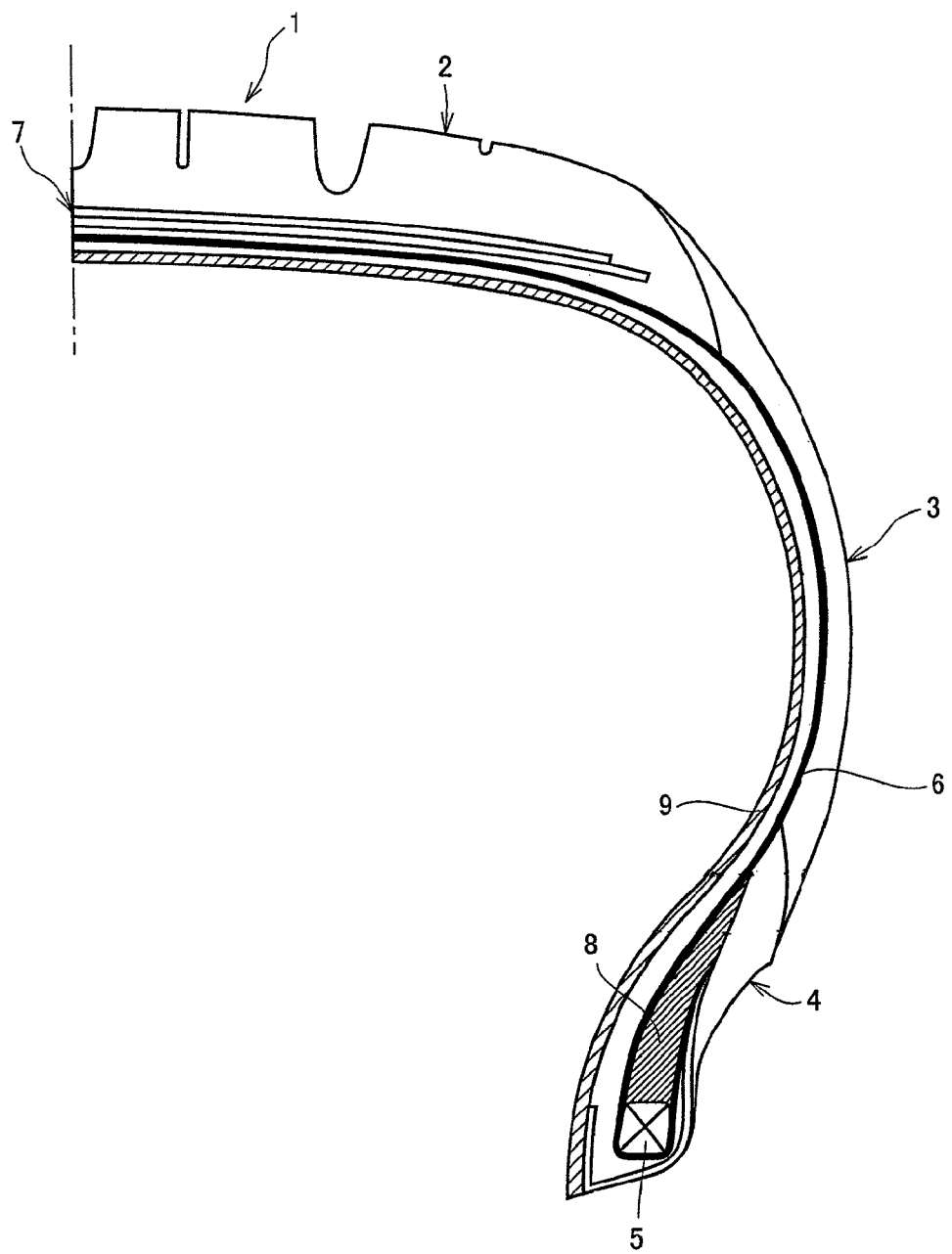
FIG. 1 is a schematic cross sectional view of the right half of a pneumatic tire of the present invention.

In the present invention, the following describes a pneumatic tire including an inner liner disposed inwardly in the tire, based on figures. FIG. 1 is a schematic cross sectional view of the right half of the pneumatic tire. In the figure, pneumatic tire 1 includes a tread portion 2, and a sidewall portion 3 and bead portions 4 so as to form a shape of toroid from the opposite ends of the tread portion. In each of bead portions 4, a bead core 5 is embedded. Further, a carcass ply 6 and a belt layer 7 are disposed. Carcass ply 6 is provided to extend from one bead portion 4 to the other bead portion, and is anchored by winding its ends around bead cores 5. Belt layer 7, which is formed of at least two plies, is disposed outside a crown portion of carcass ply 6.

Belt layer 7 is disposed such that two plies, which are formed of cords such as steel cords or aramid fibers, are arranged to allow the cords to cross each other between the plies normally at an angle of 5° to 30° relative to the tire circumferential direction. It should be noted that topping rubber layers can be provided on the outer sides of the ends of the belt layer to reduce detachment in the ends of the belt layer. Further, in the carcass ply, organic fiber cords such as polyester, nylon, or aramid are arranged at substantially 90° relative to the tire circumferential direction. In a region surrounded by the carcass ply and its turning portion, a bead apex 8 is disposed to extend from the upper end of bead core 5 in the sidewall direction. Further, an inner liner 9 is disposed inwardly relative to carcass ply 6 in the tire radial direction, so as to extend from one bead portion 4 to the other bead portion 4.

<Inner Liner>

In the present invention, the inner liner is formed of a first layer disposed inwardly in the tire, and a second layer disposed in contact with a rubber layer of the carcass ply. The first layer is a thermoplastic elastomer composition mainly containing a styrene-isobutylene-styrene block copolymer (hereinafter, also referred to as "SIBS"). The second layer is a styrene-based thermoplastic elastomer composition. At least one of the thermoplastic elastomer compositions of the first and second layers contains a tackifier by 0.1 part by mass to 100 parts by mass relative to 100 parts by mass of the thermoplastic elastomer.

<First Layer>

The first layer is made of the thermoplastic elastomer composition mainly containing the styrene-isobutylene-styrene block copolymer (SIBS). An isobutylene block in the SIBS provides a polymer film made of the SIBS with excellent air permeability resistance. Therefore, when the polymer made of the SIBS is used for the inner liner, a pneumatic tire excellent in air permeability resistance can be obtained.

Further, the molecular structure of the SIBS is completely saturated except aromatic side chain, so that the SIBS is restrained from being deteriorated and hardened and therefore has excellent durability. Therefore, when a polymer film made of the SIBS is used for the inner liner, a pneumatic tire with excellent durability can be obtained.

When manufacturing a pneumatic tire by applying such a polymer film made of the SIBS to the inner liner, air permeability resistance can be secured. Therefore, it is not necessary to use a halogenated rubber, such as a halogenated butyl rubber, which has been conventionally used to provide air permeability resistance and has a high specific gravity. Even if it is used, an amount of usage thereof can be reduced. Accordingly, weight reduction of tire can be achieved, thus improving fuel efficiency.

The molecular weight of the SIBS is not particularly limited, but the SIBS preferably has a weight average molecular weight of 50,000 to 400,000 measured through GPC measurement, in view of flowability, shaping step, rubber elasticity, and the like. When the weight average molecular weight thereof is less than 50,000, tensile strength and tensile elongation may be unfavorably decreased. On the other hand, when the weight average molecular weight thereof exceeds 400,000, extrusion workability unfavorably becomes bad. In order to further improve air permeability resistance and durability, the SIBS contains the styrene component at a content of 10 mass % to 30 mass %, preferably, 14 mass % to 23 mass %.

In the copolymer of the SIBS, the isobutylene block preferably has a degree of polymerization in a range of approximately 10,000 to 150,000, and the styrene block preferably has a degree of polymerization in a range of approximately 5,000 to 30,000, in view of rubber elasticity and handling (when the degree of polymerization is less than 10,000, each block will be in a liquid form).

The SIBS can be obtained through a general living cationic polymerization method for a vinyl-based compound. For example, each of Japanese Patent Laying-Open No. 62-48704 and Japanese Patent Laying-Open No. 64-62308 discloses that living cationic polymerization is possible between isobutylene and other vinyl compound and use of isobutylene and other compound for a vinyl compound allows for production of a polyisobutylene-based block copolymer.

The SIBS does not have a double bond other than double bond of an aromatic side chain in the molecule. Hence, the SIBS is stable to ultraviolet rays as compared with a polymer having a double bond in molecule, such as polybutadiene. Accordingly, the SIBS is excellent in weather resistance. Further, even though the SIBS does not have a double bond in the molecule and is a saturated rubbery polymer, the SIBS has a refractive index (nD) of 1.506 for light having a wavelength of 589 nm at 20° C., as indicated by Polymer Handbook, Willy, 1989. This is significantly higher than that of other saturated rubbery polymer, such as ethylene-butene copolymer.

The first layer made of such an SIBS has a thickness T1 of 0.05 mm to 0.6 mm. If the thickness of the first layer is less than 0.05 mm, the first layer may be broken due to pressing pressure when vulcanizing the raw tire in which the polymer layer stack is applied to the inner liner, with the result that an air leakage phenomenon may take place in the resulting tire. On the other hand, if the thickness of the first layer exceeds 0.6 mm, the weight of the tire is increased to result in decreased performance in fuel efficiency. Further, the first layer preferably has a thickness of 0.05 mm to 0.4 mm. The first layer can be formed in the fowl of a film by means of a general method for forming a thermoplastic resin or a thermoplastic elastomer into a film, such as extrusion molding or calender molding of the SIBS.

The first layer mainly contains the SIBS. In other words, the first layer contains the SIBS by 90 mass % or more in the thermoplastic elastomer component. For the thermoplastic elastomer, a styrene-based thermoplastic elastomer, an urethane-based thermoplastic elastomer, or the like can be used.

<Second Layer>

The second layer is the thermoplastic elastomer composition, and contains (a) a tackifier by 0.1 part by mass to 100 parts by mass relative to 100 parts by mass of the thermoplastic elastomer component, or (b) contains the styrene-isobutylene-styrene block copolymer by 10 mass % to 80 mass % in the thermoplastic elastomer component.

The second layer is preferably formed of a styrene-based thermoplastic elastomer composition. Here, the styrene-based thermoplastic elastomer refers to a copolymer including a styrene block as a hard segment. Examples thereof include: a styrene-isoprene-styrene block copolymer (hereinafter, also referred to as "SIS"); a styrene-isobutylene block copolymer (hereinafter, also referred to as "SIB"); a styrene-butadiene-styrene block copolymer (hereinafter, also referred to as "SBS"); a styrene-isobutylene-styrene block copolymer (hereinafter, also referred to as "SIBS"); a styrene-ethylene butene-styrene block copolymer (hereinafter, also referred to as "SEBS"); a styrene-ethylene propylene-styrene block copolymer (hereinafter, also referred to as "SEPS"); a styrene-ethylene ethylene propylene-styrene block copolymer (hereinafter, also referred to as "SEEPS"); and a styrene-butadiene butylene-styrene block copolymer (hereinafter, also referred to as "SBBS").

Further, the styrene-based thermoplastic elastomer may have a molecular structure having an epoxy group. A usable example thereof is Epofriend A1020 provided by Daicel Chemical Industries Ltd, i.e., an epoxy modified styrene-butadiene-styrene copolymer (epoxidized SBS) (having a weight average molecular weight of 100,000 and an epoxy equivalent of 500).

Among the above-exemplified styrene-based thermoplastic elastomers for the second layer, the styrene-isoprene-styrene copolymer (SIS) and the SIB are particularly suitable. The isoprene block of the SIS is a soft segment. Hence, a polymer film made of the SIS is likely to adhere to a rubber component through vulcanization. Therefore, when a polymer film made of SIS is used for the inner liner, a pneumatic tire excellent in durability can be obtained because the inner liner is excellent in adhesive property with the rubber layer of the carcass ply for example.

The molecular weight of the SIS is not particularly limited, but the SIS preferably has a weight average molecular weight of 100,000 to 290,000 measured through GPC measurement, in view of rubber elasticity and moldability. When the weight average molecular weight thereof is less than 100,000, tensile strength may be unfavorably decreased. On the other hand, when the weight average molecular weight thereof exceeds 290,000, extrusion workability unfavorably becomes bad. The SIS preferably contains the styrene component at a content of 10 mass % to 30 mass % in view of tackiness, adhesive property, and rubber elasticity.

In the present invention, it is preferable that in the SIS, the isoprene block has a degree of polymerization in a range of approximately 500 to 5,000 and the styrene block has a degree of polymerization in a range of approximately 50 to 1,500 in view of rubber elasticity and workability.

The SIS can be obtained through a general polymerization method for a vinyl-based compound, such as the living cationic polymerization method. The SIS layer can be formed in the form of a film by means of a general method for forming a thermoplastic resin or a thermoplastic elastomer into a film, such as extrusion molding or calender molding of the SIS.

The isobutylene block of the styrene-isobutylene block copolymer (SIB) is a soft segment. Hence, a polymer film made of the SIB is likely to adhere to a rubber component through vulcanization. Therefore, when a polymer film made of the SIB is used for the inner liner, a pneumatic tire excellent in durability can be obtained because the inner liner is excellent in adhesive property with the carcass or an adjacent rubber forming an insulation, for example.

For the SIB, a linear SIB is preferably used in view of rubber elasticity and adhesive property. The molecular weight of the SIB is not particularly limited, but the SIS preferably has a weight average molecular weight of 40,000 to 120,000 measured through GPC measurement, in view of rubber elasticity and moldability. When the weight average molecular weight thereof is less than 40,000, tensile strength may be unfavorably decreased. On the other hand, when the weight average molecular weight thereof exceeds 120,000, extrusion workability unfavorably becomes bad.

The SIB preferably contains the styrene component at a content of 10 mass % to 35 mass %, in view of tackiness, adhesive property, and rubber elasticity.

In the present invention, it is preferable that in the SIB, the isobutylene block has a degree of polymerization in a range of approximately 300 to 3,000 and the styrene block has a degree of polymerization in a range of approximately 10 to 1,500 in view of rubber elasticity and handling.

The SIB can be obtained through general living polymerization for a vinyl-based compound. For example, the SIB can be produced by adding methylcyclohexane, n-butyl chloride, and cumyl chloride into an agitator, cooling them to −70° C., reacting them for 2 hours, then adding a large amount of methanol to stop the reaction, and performing vacuum-drying at 60° C.

The SIB layer can be molded through a general method for forming a styrene-based thermoplastic elastomer into a film, such as extrusion molding or calender molding of the SIB. The second layer preferably has a thickness of 0.01 mm to 0.3 mm. Here, when the second layer is formed of only one layer such as a SIS layer or SIB layer, for example, the thickness of the second layer refers to the thickness of such a second layer. On the other hand, when the second layer is formed of two or three layers including a SIS layer, a SIB layer, and the like, the thickness of the second layer refers to the total thickness of these layers. If the thickness of the second layer is less than 0.01 mm, the second layer may be broken due to pressing pressure when vulcanizing the raw tire in which the polymer layer stack is applied to the inner liner, with the result that vulcanization adhesion strength may be decreased. On the other hand, if the thickness of the second layer exceeds 0.3 mm, the weight of the tire is increased to possibly result in decreased performance in fuel efficiency. Further, the second layer preferably has a thickness of 0.05 mm to 0.2 mm.

It should be noted that the second layer is preferably formed of a combined layer of the SIS layer and the SIB layer, but a film made of urethane rubber or silicone rubber can be disposed as a third layer between the first layer and the SIS layer, between the first layer and the SIB layer, or between the SIS layer and the SIB layer.

<SIBS Mixture>

In the present invention, the second layer can be formed of a mixture of the styrene-based thermoplastic elastomer and the SIBS, in particular, can be formed of a mixture layer of the SIS and the SIBS or a mixture of the SIB and the SIBS. In this case, an amount of blending the SIBS is adjusted to fall within a range of 10 mass % to 80 mass %, preferably 30 mass % to 70 mass % in the thermoplastic elastomer component. When the SIBS is smaller than 10 mass %, adhesive property with the first layer tends to be decreased. When the SIBS exceeds 80 mass %, adhesive property with the carcass ply tends to be decreased.

<Tackifier>

In the present invention, in at least one of the first layer and the second layer, the tackifier is blended by 0.1 part by mass to 100 parts by mass of a thermoplastic elastomer component. Here, the "tackifier" refers to an additive for increasing tackiness of the thermoplastic elastomer composition. Examples of such a tackifier will be illustrated below. Further, desirably, the tackifier has a weight average molecular weight Mw of $1 \times 10^2$ to $1 \times 10^6$, and has a softening point falling within a range of 50° C. to 150° C. If the weight average molecular weight thereof is less than $1 \times 10^2$, a degree of viscosity becomes low to result in disadvantage in sheet moldability. On the other hand, if the weight average molecular weight thereof exceeds $1 \times 10^6$, the first layer and the second layer are provided with insufficient tackiness.

[C9 Petroleum Resin]

A C9 petroleum resin is an aromatic petroleum resin obtained by polymerizing C5 to C9 fractions (mainly C9 fraction) in a mixed state. The C5 to C9 fractions are remnants when obtaining useful compounds, such as ethylene, propylene, and butadiene, by thermally decomposing naphtha. Examples thereof include products such as: ARKON P70, P90, P100, P125, P140, M90, M100, M115, and M135 (each provided by Arakawa Chemical Industries, Ltd, and having a softening point of 70° C. to 145° C.); I-MARV S100, S110, P100, P125, and P140 (aromatic copolymer-based hydrogenated petroleum resins each provided by Idemitsu Petrochemical Ltd, having a softening point of 100° C. to 140° C., having a weight average molecular weight of 700 to 900, and having a bromine number of 2.0 g/100 g to 6.0 g/100 g); and Petcoal XL (provided by TOSOH Corporation).

[C5 Petroleum Resin]

A C5 petroleum resin is an aliphatic petroleum resin obtained by polymerizing C4 to C5 fractions (mainly C5 fraction) in a mixed state. The C4 to C5 fractions are remnants when obtaining useful compounds, such as ethylene, propylene, and butadiene, by thermally decomposing naphtha. Examples thereof include products such as: Hilets G100 (provided by Mitsui Petrochemicals Industries, Ltd, and having a softening point of 100° C.); Marcalets T100AS (provided by Maruzen Petrochemical Co., Ltd, and having a softening point of 100° C.); and Escorez 1102 (provided by Tonex Co., Ltd, and having a softening point of 110° C.).

[Terpene Resin]

Examples of the terpene resin include products such as: YS resin PX800N, PX1000, PX1150, PX1250, and PXN1150N; and Clearon P85, P105, P115, P125, P135, P150, M105, M115, and K100 (each provided by Yasuhara Chemical Co., Ltd, and having a softening point of 75° C. to 160° C.).

[Aromatic Modified Terpene Resin]

Examples of the aromatic modified terpene resin include products such as: YS resin TO85, TO105, TO115, and TO125 (each provided by Yasuhara Chemical Co., Ltd, and having a softening point of 75° C. to 165° C.).

[Terpene Phenol Resin]

Examples of the terpene phenol resin include products such as: Tamanol 803L, and 901 (provided by Arakawa Chemical Industries Co., Ltd, and having a softening point of 120° C. to 160° C.); and YS Polyster U115, U130, T80, T100, T115, T145, and T160 (each provided by Yasuhara Chemical Co., Ltd, and having a softening point of 75° C. to 165° C.).

[Cumarone Resin]

Examples of the cumarone resin include a cumarone resin having a softening point of 90° C. (provided by Kobe Oil Chemical Industrial Co., Ltd).

[Cumarone Indene Oil]

Examples of the cumarone indene oil include products such as 15E (provided by Kobe Oil Chemical Industrial Co., Ltd, and having a fluidizing point of 15° C.).

[Rosin Ester]

Examples of the rosin ester include products such as: ester gum AAL, A, AAV, 105, AT, H, HP, and HD (each provided by Arakawa Chemical Industries Co., Ltd, and having a softening point of 68° C. to 110° C.); and Hariester TF, S, C, DS7OL, DS90, and DS130 (each provided by Ilarima Chemicals Inc., and having a softening point of 68° C. to 138° C.).

[Hydrogenated Rosin Ester]

Examples of the hydrogenated rosin ester include products such as Superester A75, A100, A115, and A125 (each provided by Arakawa Chemical Industries Co., Ltd., and having a softening point of 70° C. to 130° C.).

[Alkylphenol Resin]

Examples of the alkylphenol resin include products such as Tamanol 510 (provided by Arakawa Chemical Industries Co., Ltd, and having a softening point of 75° C. to 95° C.).

[DCPD]

Examples of the DCPD include products such as Escorez S300 (provided by Tonex Co., Ltd, and having a softening point of 105° C.).

For the tackifier, a fully hydrogenated petroleum resin of the C9 petroleum resins is well compatible with the SIB, and can improve adhesive property without decreasing the gas barrier property. Further, it has an effect of decreasing a degree of viscosity, and therefore can be used for film extrusion molding.

The tackifier is blended in a range of 0.1 part by mass to 100 parts by mass, preferably, 1 part by mass to 50 parts by mass relative to 100 parts by mass of the thermoplastic elastomer of the first layer. If the tackifier is blended by less than 0.1 part by mass, vulcanization adhesion strength with the second layer is insufficient. On the other hand, if the tackifier is blended by more than 100 parts by mass, the tackiness becomes too high, with the result that workability and productivity are decreased and the gas barrier property is also decreased.

The second layer is disposed between the first layer disposed inwardly in the tire and the carcass ply, and is required to have an adhesive property with them. To attain this, the tackifier is blended in a range of 0.1 part by mass to 100 parts by mass, preferably, 1 part by mass to 50 parts by mass relative to 100 parts by mass of the thermoplastic elastomer of the second layer. If the tackifier is blended by less than 0.1 part by mass, vulcanization adhesion strength with the first layer is insufficient. On the other hand, if the tackifier is blended by more than 100 parts by mass, the tackiness becomes too high, with the result that workability and productivity are decreased and the gas barrier property is also decreased.

<Polymer Layer Stack>

In the present invention, the inner liner employs the polymer layer stack formed of the first layer and the second layer. Here, the first layer and the second layer are thermoplastic elastomer compositions, and are in a softened state in a mold at a vulcanizing temperature, for example, 150° C. to 180° C. The term "softened state" refers to an intermediate state between solid and liquid with improved molecular mobility. Further, when the thermoplastic elastomer composition is in the softened state, the thermoplastic elastomer composition is likely to stick to and adhere to an adjacent member. Therefore, in order to prevent the thermoplastic elastomer from being changed in shape and sticking to and fusing with an adjacent member, a cooling step is required in manufacturing the tire. After the tire vulcanization, the cooling step is performed to quench for 10 seconds to 300 seconds to 50° C. to 120° C., thereby cooling inside of the bladder. For a coolant, one or more of coolants selected from air, water vapor, water, and oil are used. By employing such a cooling step, the inner liner can be formed to be thin i.e., to fall within a range of 0.05 mm to 0.6 mm.

Figure 2:
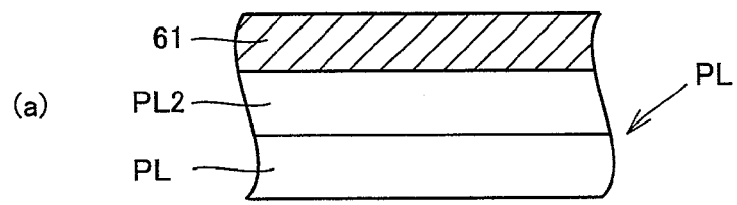
Figure 2:
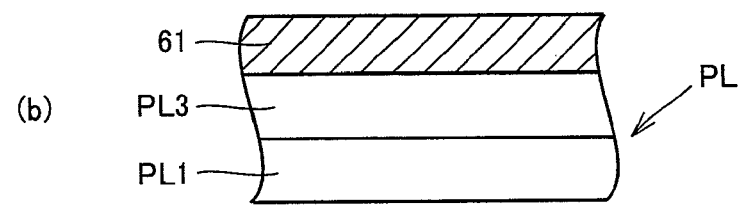
Figure 2:
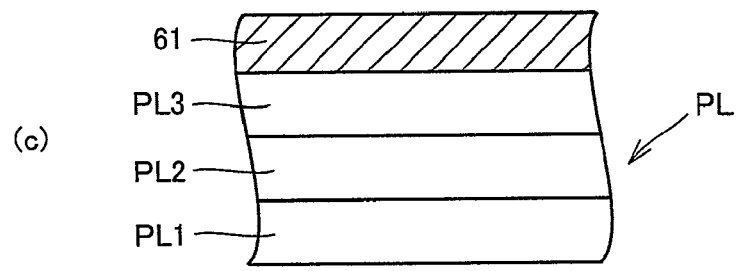
Figure 2:
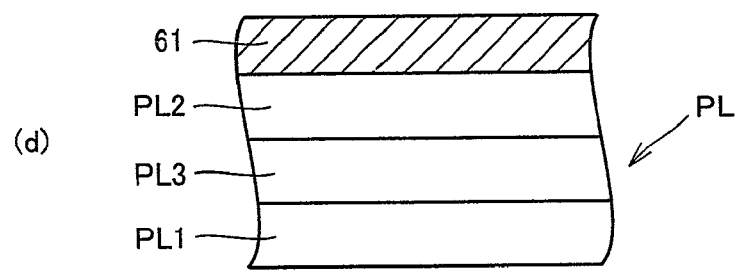

The following illustrates an arrangement of the inner liner with respect to the carcass ply in the vulcanized tire, with reference to FIG. 2. In FIG. 2(a), a polymer layer stack PL is formed of an SIBS layer PL1 serving as the first layer, and an SIS layer PL2 serving as the second layer. When applying polymer layer stack PL to the inner liner of the pneumatic tire and disposing SIS layer PL2 outwardly in the tire radial direction so as to bring SIS layer PL2 into contact with carcass ply 61, adhesive strength between SIS layer PL2 and carcass 61 can be increased in the step of vulcanizing the tire. Accordingly, in the resulting pneumatic tire, the inner liner and the rubber layer of carcass ply 61 are adhered to each other in an excellent manner. Thus, the pneumatic tire can have excellent air permeability resistance and durability.

In FIG. 2(b), polymer layer stack PL is formed of SIBS layer PL1 serving as the first layer, and an SIB layer PL3 serving as the second layer. When applying polymer layer stack PL to the inner liner of the pneumatic tire and disposing a surface of SIB layer PL3 outwardly in the tire radial direction so as to bring the surface of SIB layer PL3 into contact with carcass ply 61, adhesive strength between SIB layer PL3 and carcass 61 can be increased in the step of vulcanizing the tire. Accordingly, in the resulting pneumatic tire, the inner liner and the rubber layer of carcass ply 61 are adhered to each other in an excellent manner. Thus, the pneumatic tire can have excellent air permeability resistance and durability.

In FIG. 2(c), polymer layer stack PL is formed of SIBS layer PL1 serving as the first layer, SIS layer PL2 and SIB layer PL3 both serving as the second layer. SIBS layer PL1, SIS layer PL2, and SIB layer PL3 are stacked on one another in this order. When applying polymer layer stack PL to the inner liner of the pneumatic tire and disposing a surface of SIB layer PL3 outwardly in the tire radial direction so as to bring the surface of SIB layer PL3 into contact with carcass ply 61, adhesive strength between SIB layer PL3 and carcass ply 61 can be increased in the step of vulcanizing the tire. Accordingly, in the resulting pneumatic tire, the inner liner and the rubber layer of carcass ply 61 are adhered to each other in an excellent manner. Thus, the pneumatic tire can have excellent air permeability resistance and durability.

In FIG. 2(d), polymer layer stack PL is formed of SIBS layer PL1 serving as the first layer, and SIB layer PL3 and SIS layer PL2 both serving as the second layer. SIBS layer PL1, SIB layer PL3, and SIS layer PL2 are stacked on one another in this order. When applying polymer layer stack PL to the inner liner of the pneumatic tire and disposing a surface of SIS layer PL2 outwardly in the tire radial direction so as to bring the surface of SIS layer PL2 into contact with carcass ply 61, adhesive strength between SIS layer PL2 and carcass ply 61 can be increased in the step of vulcanizing the tire. Accordingly, the inner liner and the rubber layer of carcass ply 61 are adhered to each other in an excellent manner. Thus, the pneumatic tire can have excellent air permeability resistance and durability.

<Method for Manufacturing Pneumatic Tire>

The pneumatic tire of the present invention can be manufactured using a general manufacturing method. Polymer layer stack PL described above is used to manufacture a strip. Then, the above-described method is used to manufacture the inner liner. Pneumatic tire 1 can be manufactured by applying the above-described inner liner to the raw tire of pneumatic tire 1 and vulcanizing and molding them together with other members. When disposing polymer layer stack PL on the raw tire, the second layer of polymer layer stack PL, i.e., SIS layer PL2 or SIB layer PL3 is disposed outwardly in the tire radial direction in contact with carcass ply 61. With this arrangement, in the tire vulcanization step, adhesive strength can be increased between carcass 6 and the second layer made of the styrene-based thermoplastic elastomer composition, such as SIS layer PL2 or SIB layer PL3. In the resulting pneumatic tire, the inner liner and the rubber layer of carcass ply 61 are adhered to each other in an excellent manner. Thus, the pneumatic tire can have excellent air permeability resistance and durability.

EXAMPLES

<Polymer Layer Stack>
The thermoplastic elastomers (SIB, SIBS, and SIS) used for manufacturing of polymer layer stacks each formed of the first layer and the second layer in the present invention were prepared in the following manner.

[SIB]
Into a 2L reaction container having an agitator, 589 mL of methylcyclohexane (dried with molecular sieves), 613 ml of n-butyl chloride (dried with molecular sieves), and 0.550 g of cumyl chloride were added. The reaction container was cooled to −70° C., and then 0.35 mL of α-picoline (2-methylpyridine) and 179 mL of isobutylene were added. Further, 9.4 mL of titanium tetrachloride was added to start polymerization. They were reacted with each other for 2.0 hours while stirring the solution at −70° C. Next, 59 mL of styrene was added to the reaction container, and reaction was continued for another 60 minutes. Thereafter, a large amount of methanol was added to stop the reaction. After removing a solvent and the like from the reaction solution, the polymer was dissolved with toluene and rinsed twice. This toluene solution was added to a methanol mixture to precipitate a polymer. The polymer thus obtained was dried at 60° C. for 24 hours, thereby obtaining a styrene-isobutylene diblock copolymer (the content of the styrene component: 15 mass %; weight average molecular weight: 70,000).

[SIBS]
"SIBSTAR 102 (Shore A hardness: 25; the content of the styrene component: 25 mass %; weight average molecular weight: 100,000)" provided by Kaneka Corporation was used.

[SIS]
D1161JP (the content of the styrene component: 15 mass %; weight average molecular weight: 150,000) provided by Kraton Polymers was used.

<Method for Manufacturing Inner Liner>
The above-described styrene-based thermoplastic elastomers such as SIBS, SIS, and SIB were pelletized using a biaxial extruder (screw diameter: φ50 mm; L/D: 30; cylinder temperature: 220° C.). Thereafter, the inner liner was fabricated using a T-die extruder (screw diameter: φ80 mm; L/D: 50; die gap width: 500 mm; cylinder temperature: 220° C.; film gauge: 0.3 mm).

<Manufacturing of Pneumatic Tire>
The pneumatic tire was manufactured as follows. That is, a raw tire was manufactured by using the above-described polymer layer stack for the inner liner in a product having the basic structure shown in FIG. 1 with a size of 195/65R15. Then, in the vulcanization step, press vulcanization was performed at 170° C. for 20 minutes. Then, the tire was cooled for 3 minutes at 100° C. without removing the tire from the vulcanization mold, and then was removed from the vulcanization mold. As a coolant therefor, water was used. By employing such a cooling step, the inner liner manufactured can be formed of a thin film of 0.3 mm.

TABLE 1

| | | Comparative Example 1 | Comparative Example 2 | Comparative Example 3 | Comparative Example 4 | Example 1 | Example 2 | Example 3 | Example 4 | Example 5 | Example 6 |
|---|---|---|---|---|---|---|---|---|---|---|---|
| First Layer | SIBS (Mass %) | 100 | 100 | 100 | 100 | 100 | 100 | 100 | 100 | 100 | 100 |
| Second Layer | Second a Layer: SIS (Mass %) | 100 | | 100 | 100 | 90 | | 20 | | 100 | 100 |
| | Second b Layer: SIB (Mass %) | | 100 | | | | 90 | | 20 | | |
| | SIBS (Mass %) | | | | | 10 | 10 | 80 | 80 | | |
| | Tackifier A (Part by Mass) | | | 0.05 | 110 | | | | | 1 | |
| | Tackifier B (Part by Mass) | | | | | | | | | | 1 |
| | Tackifier C (Part by Mass) | | | | | | | | | | |
| Tire Test | Vulcanization Adhesion Strength | 100 | 100 | 95 | 250 | 170 | 170 | 250 | 250 | 150 | 150 |
| | Flection Crack Growth | 100 | 100 | 95 | 150 | 130 | 130 | 150 | 150 | 140 | 135 |
| | Rolling Resistance Change Ratio | 100 | 100 | 97 | 95 | 105 | 105 | 106 | 106 | 103 | 103 |
| | Static Air Decreasing Ratio (%/Month) | 2.7 | 2.7 | 2.7 | 2.7 | 1.7 | 1.7 | 1.5 | 1.5 | 2.6 | 2.6 |
| Total Judgment | | B | B | B | B | A | A | A | A | A | A |

TABLE 2

| | | Example 7 | Example 8 | Example 9 | Example 10 | Example 11 | Example 12 | Example 13 | Example 14 | Example 15 | Example 16 |
|---|---|---|---|---|---|---|---|---|---|---|---|
| First Layer | SIBS (Mass %) | 100 | 100 | 100 | 100 | 100 | 100 | 100 | 100 | 100 | 100 |
| Second Layer | Second a Layer SIS (Mass %) | 100 | | 100 | | 90 | | 20 | | 90 | 20 |
| | Second b Layer: SIB (Mass %) | | 100 | | 100 | | 90 | | 20 | | |
| | SIBS (Mass %) | | | | | 10 | 10 | 80 | 80 | 10 | 80 |
| | Tackifier A (Part by Mass) | | 1 | 100 | 100 | 1 | 1 | 1 | 1 | 100 | 100 |
| | Tackifier B (Part by Mass) | | | | | | | | | | |
| | Tackifier C (Part by Mass) | 1 | | | | | | | | | |
| Tire Test | Vulcanization Adhesion Strength | 145 | 150 | 250 | 250 | 200 | 200 | 280 | 280 | 300 | 380 |
| | Flection Crack Growth | 135 | 140 | 170 | 170 | 160 | 160 | 180 | 180 | 190 | 200 |
| | Rolling Resistance Change Ratio | 103 | 103 | 101 | 101 | 105 | 105 | 106 | 106 | 101 | 101 |
| | Static Air Decreasing Ratio (%/Month) | 2.6 | 2.6 | 2.6 | 2.6 | 1.7 | 1.7 | 1.5 | 1.5 | 1.7 | 1.5 |
| Total Judgment | | A | A | A | A | A | A | A | A | A | A |

TABLE 3

| | | Comparative Example 5 | Comparative Example 6 | Example 17 | Example 18 | Example 19 | Example 20 | Example 21 | Example 22 | Example 23 | Example 24 |
|---|---|---|---|---|---|---|---|---|---|---|---|
| First Layer | SIBS (Mass %) | 100 | 100 | 100 | 100 | 100 | 100 | 100 | 100 | 100 | 100 |
| | Tackifier A (Part by Mass) | 0.05 | 110 | 1 | 1 | 1 | 1 | 1 | 1 | 1 | 1 |
| | Tackifier B (Part by Mass) | | | | | | | | | | |
| | Tackifier C (Part by Mass) | | | | | | | | | | |
| Second Layer | Second a Layer: SIS (Mass %) | 100 | 100 | 100 | | 90 | 20 | 100 | 100 | 100 | 100 |
| | Second b Layer: SIB (Mass %) | | | | 100 | | | | | | |
| | SIBS (Mass %) | | | | | 10 | 80 | | | | |
| | Tackifier A (Part by Mass) | | | | | | | 1 | 100 | | |
| | Tackifier B (Part by Mass) | | | | | | | | | 1 | 100 |
| | Tackifier C (Part by Mass) | | | | | | | | | | |
| Tire Test | Vulcanization Adhesion Strength | 95 | 200 | 170 | 170 | 220 | 300 | 200 | 300 | 200 | 300 |
| | Flection Crack Growth | 95 | 95 | 130 | 130 | 170 | 170 | 160 | 110 | 160 | 110 |
| | Rolling Resistance Change Ratio | 97 | 95 | 103 | 103 | 105 | 106 | 103 | 101 | 103 | 101 |
| | Static Air Decreasing Ratio (%/Month) | 2.6 | 3.5 | 2.3 | 2.3 | 1.7 | 1.5 | 2.6 | 2.6 | 2.6 | 2.6 |
| Total Judgment | | B | B | A | A | A | A | A | A | A | A |

TABLE 4

| | | Example 25 | Example 26 | Example 27 | Example 28 | Example 29 | Example 30 | Example 31 | Example 32 |
|---|---|---|---|---|---|---|---|---|---|
| First Layer | SIBS (Mass %) | 100 | 100 | 100 | 100 | 100 | 100 | 100 | 100 |

TABLE 4-continued

|  |  | Example 25 | Example 26 | Example 27 | Example 28 | Example 29 | Example 30 | Example 31 | Example 32 |
|---|---|---|---|---|---|---|---|---|---|
|  | Tackifier A (Part by Mass) | 1 | 1 | 1 | 100 |  |  |  |  |
|  | Tackifier B (Part by Mass) |  |  |  |  | 1 | 100 |  |  |
|  | Tackifier C (Part by Mass) |  |  |  |  |  |  | 1 | 100 |
| Second Layer | Second a Layer : SIS (Mass %) | 100 | 100 | 90 | 90 | 90 | 90 | 90 | 90 |
|  | Second b Layer : SIB (Mass %) |  |  |  |  |  |  |  |  |
|  | SIBS (Mass %) |  |  | 10 | 10 | 10 | 10 | 10 | 10 |
|  | Tackifier A (Part by Mass) |  |  | 1 | 1 | 1 | 1 | 1 | 1 |
|  | Tackifier B (Part by Mass) |  |  |  |  |  |  |  |  |
|  | Tackifier C (Part by Mass) | 1 | 100 |  |  |  |  |  |  |
| Tire Test | Vulcanization Adhesion Strength | 200 | 300 | 250 | 350 | 240 | 330 | 230 | 300 |
|  | Flection Crack Growth | 160 | 110 | 200 | 150 | 190 | 140 | 190 | 140 |
|  | Rolling Resistance Change Ratio | 103 | 101 | 110 | 101 | 109 | 101 | 108 | 101 |
|  | Static Air Decreasing Ratio (%/Month) | 2.6 | 2.6 | 1.7 | 2.6 | 1.7 | 2.6 | 1.7 | 2.6 |
| Total Judgment |  | A | A | A | A | A | A | A | A |

(Note 1)
Tackifier A: C9 petroleum resin, ARKON P140 (provided by Arakawa Chemical Industries Co., Ltd; softening point: 140° C.; weight average molecular weight Mw: 900).
(Note 2)
Tackifier B: terpene resin, YS resin PX1250 (provided by Yasuhara Chemical Co., Ltd; softening point of 125° C.; weight average molecular weight Mw: 700).
(Note 3)
Tackifier C: hydrogenated rosin ester, super ester A125 (provided by Arakawa Chemical Industries Co., Ltd; softening point: 125° C.; weight average molecular weight Mw: 700).

Comparative Examples 1 to 4 and Examples 1 to 16

In Comparative Examples 1 and 2, no tackifier was blended in each of the first layer and the second layer. In Comparative Example 3, the tackifier was blended in the second layer by 0.05 parts by mass. In Comparative Example 4, the tackifier was blended in the second layer by 110 parts by mass. In each of Examples 1 to 4, the SIBS was contained in the second layer. In each of Examples 5 to 10, the tackifier was blended in the second layer. In each of Examples 11 to 16, both the SIBS and the tackifier are used in the second layer.

Each of Examples 1 to 16 is more excellent than Comparative Example 1 in terms of vulcanization adhesion strength, flection crack growth, rolling resistance change ratio, and static air decreasing ratio.

Comparative Example 5, Comparative Example 6, and Examples 17 to 24

In Comparative Example 5, the tackifier was blended in the first layer by 0.05 parts by mass. In Comparative Example 6, the tackifier was blended in the first layer by 110 parts by mass. In each of Examples 17 and 18, the tackifier was blended in the first layer. In each of Examples 19 and 20, the tackifier was blended in the first layer and the SIBS was blended in the second layer. In each of Examples 21 to 26, the tackifier was blended in the first layer and the second layer. In each of Examples 27 to 32, the tackifier was blended in the first layer, and the tackifier and the SIBS were blended in the second layer.

In each of Examples 17 to 32, a predetermined amount of the tackifier was blended in the first layer or the second layer. Hence, Examples 17 to 32 are more excellent as a whole than Comparative Examples 5 and 6 in terms of vulcanization adhesion strength, flection crack growth, rolling resistance change ratio, and static air decreasing ratio.

<Performance Test>

For each of the pneumatic tires manufactured as described above, the following performance evaluation was conducted.

<Vulcanization Adhesion Strength>

The first layer was adhered to the carcass ply layer, and the first layer was adhered to non-vulcanized rubber sheet of the second layer. Then, they were vulcanized at 170° C. for 20 minutes. In this way, samples for measurement of vulcanization adhesion strength were fabricated. Vulcanization adhesion strength was measured by measuring detachment force using a tension tester. According to the below-described formula, vulcanization adhesion strength for each blend was expressed in an index with Comparative Example 1 being regarded as a reference. It should be noted that as the index of the vulcanization adhesion strength is larger, the vulcanization adhesion strength is higher.

The Index of the Vulcanization Adhesion Strength=
(the Vulcanization Adhesion Strength of Each Blend)/(the Vulcanization Adhesion Strength of Comparative Example 1)×100

<Flection Crack Growth Test>

In endurance traveling test, evaluation was made depending on whether the inner liner was cracked or detached. Each trial tire was assembled to a JIS specification rim 15×6JJ. The tire internal pressure was set at 150 KPa, which was lower internal pressure than normal internal pressure. The load was set at 600 kg. The speed was set at 100 km/h. The travel distance was set at 20,000 km. Inside of the tire was observed to measure the number of cracks and detachments. With Comparative Example 1 being regarded as a reference, crack growth in each blend was expressed in an index. As the value of the index is larger, the flection crack growth is smaller.

Flection Crack Growth Index=(the Number of Cracks in Comparative Example 1)/(the Number of Cracks in Each Blend)×100

<Rolling Resistance Index>

Each trial tire was assembled to a JIS specification rim 15×6JJ, and a rolling resistance tester provided by Kobe Steel Ltd was used to measure rolling resistance thereof while performing traveling at a room temperature (30° C.) under conditions of a load of 3.4 kN, an air pressure of 230 kPa, and a speed of 80 km/h. Based on the below-described formula, the rolling resistance change ratio (%) of each Example was expressed in an index with Comparative Example 1 being 100 as a reference. As the rolling resistance change ratio is larger, the rolling resistance is further reduced.

Rolling Resistance Index=(Rolling Resistance of Comparative Example 1/Rolling Resistance of Example)×100

<Static Air Pressure Decreasing Ratio Test>

Each trial tire was assembled to a JIS specification rim 15×6JJ, and air was introduced thereinto at an initial air pressure of 300 kPa. Then, the trial tire was left for 90 days at a room temperature. Then, decreasing ratio of air pressure was calculated. As the numerical value thereof is smaller, the air pressure was less decreased.

INDUSTRIAL APPLICABILITY

The pneumatic tire of the present invention is applicable to a pneumatic tire for passenger car, a tire for truck/bus, a tire for lightweight truck, and a pneumatic tire for heavy vehicle.

REFERENCE SIGNS LIST

1: pneumatic tire; 2: tread portion; 3: sidewall portion; 4: bead portion; 5: bead core; 6: carcass ply; 7: belt layer; 8: bead apex; 9: inner liner; PL: polymer layer stack; PL1: SIBS layer; PL2: SIS layer; PL3: SIB layer.

The invention claimed is:

1. A pneumatic tire comprising an inner liner disposed inwardly in the tire relative to a carcass ply bridged between a pair of bead portions,
    said inner liner being formed of a first layer disposed inwardly in the tire, and a second layer disposed in contact with a rubber layer of said carcass ply,
    said first layer being a thermoplastic elastomer composition mainly containing a styrene-isobutylene-styrene block copolymer, and
    said second layer being a thermoplastic elastomer composition containing 20 mass % to 90 mass % of a styrene-isobutylene diblock copolymer relative to a thermoplastic elastomer component thereof, said styrene-isobutylene diblock copolymer being linear, said styrene-isobutylene diblock copolymer containing a styrene component at a content of 10 mass % to 35 mass %, said second layer containing the styrene-isobutylene-styrene block copolymer by 10 mass % to 80 mass % relative to a thermoplastic elastomer component thereof.

2. The pneumatic tire according to claim 1, wherein the first layer has a thickness of 0.05 mm to 0.6 mm and the second layer has a thickness of 0.01 mm to 0.3 mm.

3. The pneumatic tire according to claim 1, wherein said styrene-isobutylene-styrene block copolymer contains a styrene component at a content of 10 mass % to 30 mass %.

* * * * *